United States Patent [19]
Lewis et al.

[11] Patent Number: 5,782,488
[45] Date of Patent: Jul. 21, 1998

[54] STRESS REDUCER PASSENGER CUSHION

[75] Inventors: Trudy C. Lewis, Roy; Dennis K. Talbot, West Point; Douglas V. Fairbanks, Logan, all of Utah

[73] Assignee: Morton International, Inc., Chicago, Ill.

[21] Appl. No.: 665,769

[22] Filed: Jun. 14, 1996

[51] Int. Cl.⁶ ............................................. B60R 21/20
[52] U.S. Cl. .............................. 280/743.1; 280/728.2
[58] Field of Search ............................ 280/728.2, 743.1

[56] References Cited

U.S. PATENT DOCUMENTS

| | | | |
|---|---|---|---|
| 5,342,081 | 8/1994 | Rogerson | 280/728.2 |
| 5,375,878 | 12/1994 | Ellerbrok | 280/743.1 |

Primary Examiner—Kenneth R. Rice
Attorney, Agent, or Firm—A. Donald Messenheimer; Steven C. Benjamin; Gerald K. White

[57] ABSTRACT

A three piece bag construction for an air bag cushion adapted to be deployed in the event of a collision has reduced stress at corners of the mouth. An elongated central main panel 10 totally surrounds the two side panels 12 and 14 and has end portions which form a transition section leading from the mouth 16 to the interior of the cushion. No part of the side panels 12 or 14 extends to the mouth 16. Seams extending from the four corners of the bag mouth 16 through the mouth/attach area to the side panels 52 and 54 found in traditional bags where high stress occurs, are not used in the present invention. A novel rod and rod pocket assembly facilitates attachment of the cushion to a conventional module.

15 Claims, 2 Drawing Sheets

STRESS REDUCER PASSENGER CUSHION

This invention relates to construction of an air bag cushion for the passenger side of a vehicle and more particularly to an improved bag construction having panels so shaped that seams are uniquely located to eliminate high stresses along seams which in the past have been points where cushion failure has occurred.

BACKGROUND

Air bag cushions have found wide-spread use in passenger vehicles such as the personal automobile. Driver side air bag cushions are much more standardized as to size and displacement than are passenger side air bag cushions. For the larger passenger side air bag cushions, some of the cushion failures have been observed to occur along seams starting at the bag mouth where inflation gasses, which are normally very hot, are introduced into the air bag to form the cushion. Rather than strengthening the existing seam areas which are exposed to these high stress concentrations, the shapes of the major three panels in the bag construction have been altered.

SUMMARY OF THE INVENTION

An object of the invention is to provide a novel construction for an air bag cushion which is effective to reduce stress concentrations in seams exposed to the forces due to the gasses introduced into the bag during deployment.

The central main panel has been made somewhat longer than the periphery of the side panels which no longer have a snout or other portion that extends to the mouth of the air bag cushion. Material has been reshaped at the end portions of the main panel so that the mouth/attach area does not include any portion of the side panels. As a result, the side panels are more rounded.

The reshaping of the panels gives more options to use alternative cutting methods such as gerber, die, scissor, laser and hot knife cutting because there are no raw edges at the four corners of the mouth. However, there is one area on both the inboard and outboard sides of the mouth where the mouth/attach area has raw edges. The difference in having raw edges at this area is that the hot gasses do not affect this area such that fraying occurs. Finally, this area does not get the stress that occurs at the region of the attachment to the module such as the rod pocket areas. Because the fabric forming the mouth/attach area may all be part of the main panel, the side panels can have a more rounded shape than is possible with the traditional three piece cushion. This makes for easier sewing and therefore saves time and reduces labor costs.

Also it has been found that the central main panel can be cut sufficiently wide to contain all the material needed for the mouth/attach area without exceeding the largest width of the central main panel. The efficiency of fabric usage is thus more favorable.

This extra width which extends laterally beyond the width of the cushion mouth provides flaps which can be folded toward each other and stitched along a line to form sidewalls for the mouth attach area. This stitch line on each side may start at a position located at about mid-way between the upper and lower edges of the mouth rather than being at the high stress areas at the four corners of the mouth, and continue to the periphery of the side panel.

Since the new side panels are generally rounded without a snout, they can be nested on the fabric with less fabric usage than is required for the traditional three piece cushion.

Because the cushion is more robust, there is less need for reinforcement that has been used in the traditional cushion in some cases.

Because there are no seams to propagate, the failure mode is reduced with use of the present invention.

These and other objects and benefits of the invention will become more fully apparent from the claims and from the detailed description when read in conjunction with the appended drawings.

DETAILED DESCRIPTION OF PREFERRED EMBODIMENTS

Figure 1:
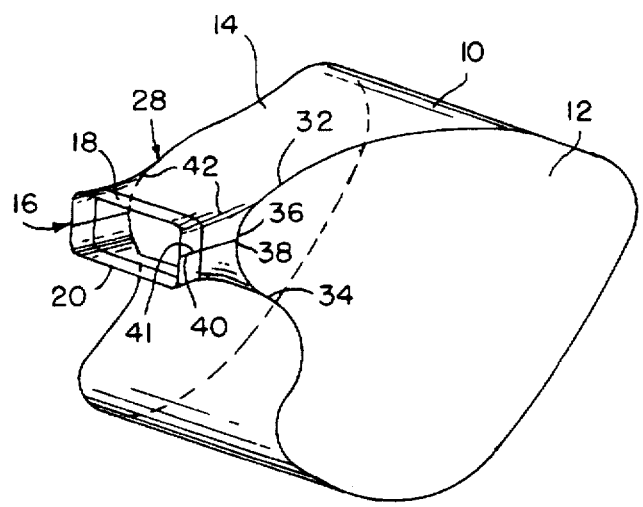
FIG. 1 is a pictorial drawing showing an air bag cushion according to the invention.
Figure 2:
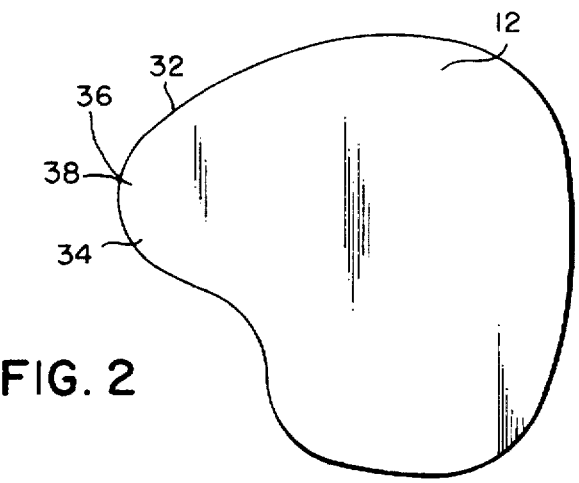
FIG. 2 is a lay-out of the side panels used in the cushion of FIG. 1.
Figure 3:
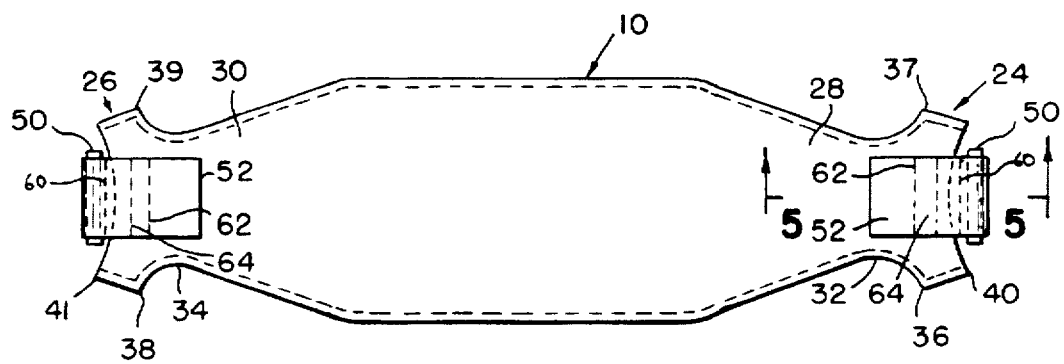
FIG. 3 is a lay-out of the central main panel used in the cushion of FIG. 1.

With reference to FIGS. 1-3 of the drawings, passenger side air bag cushion according to the invention has three major panels, a central main panel 10 and two essentially identical side panels 12 and 14. The air bag may be formed with a mouth 16 having a width of about 200-250 mm and a height between the upper mouth edge 18 and the lower mouth edge 20 that is less than one half of the mouth width. The mouth 16 is adapted to be secured to a module (not shown) that is fixed to the vehicle in a known manner such as is illustrated in the Folsom et al. U.S. Pat. No. 5,501,489 using a rod that is slidably mounted in a rod pocket or in the Zelenak, Jr. et al. U.S. Pat. No. 5,022,675 using threaded studs, the disclosures of which are hereby incorporated by reference.

The side panels 12 and 14 can advantageously have the same size and shape for many applications. A generally rounded shape and periphery with large radii is advantageous for a number of reasons including making sewing easier. Exact identity is not required.

The central main panel 10 of the air bag according to the preferred embodiment is illustrated in FIG. 3 and has a central portion which is attached on opposite sides to the outer peripheries of the respective side panels 12 and 14 as shown in FIG. 1. The shapes of the side panels 12 and 14 and the widest portion of the main panel 10 which surrounds the entire periphery of the side panels determine the shape and size of the air bag cushion when deployed and therefore may vary to meet the requirements of the vehicle manufacturer concerning folding as well as deployment.

Side panels 12 and 14 have a curved outer periphery that is attached to opposite sides of the central panel 10 by a seam between points 36 and 38 on one side and points 37 and 39 on the other side. This produces an enclosure wherein the central panel totally surrounds the peripheral edges of the side panels between points 36 and 38 on the one side and between points 37 and 39 on the other side and leaves two overlapping end portions 24 and 26 (see FIG. 3) which are in juxta position at the location of the bag mouth 16 (see FIG. 1).

The main panel 10 has a maximum width, typically 450 to 500 mm, at the central portion along its length which is adapted during deployment to extend to the occupant seating position. Main panel 10 has at opposite end portions 24 and 26, transition sections 28 and 30 which neck down to a minimum width at positions 32 and 34 followed by a flare outwardly from point 32 to point 36 at the end 24 and from point 34 to point 38 at the opposite end 25. FIG. 2 shows the location of points 32, 34, 36 and 38 when the side panel 12 is secured to the main panel 10. It should be noted that points 36 and 38 are at the same position on side panel 12 and that points 37 and 39 have the same relationship on side panel 14. The opposite end portions 24 and 26 are thus in juxtaposition to each other at the bag mouth 16.

The mouth 16 has upper edge 18 and lower edge 20 which are adapted for connection to the usual module, not shown. Mouth 16 is connected to the bag interior by the transition section or throat that terminates at or about the region marked by reference numerals 28, 32 and 34 in FIG. 1. This transition section is formed from only material that is in the pattern for the main panel 10. No part of the fabric forming the side panels 12 and 14 extends to the mouth 16.

Figure 5:
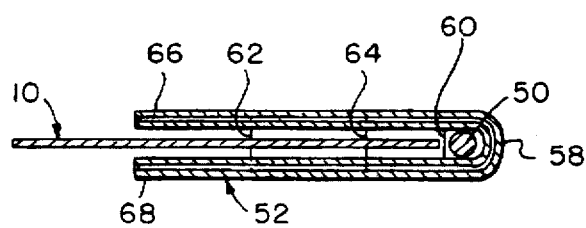
FIG. 5 is a view to an enlarged scale of the rod pocket taken along lines 5—5 of FIG. 3.
Figure 4:
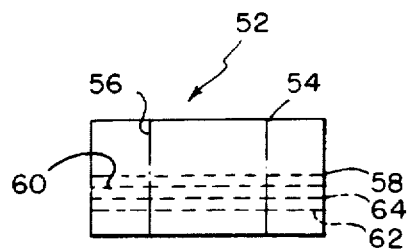
FIG. 4 is a lay-out of the panel used to form the rod pocket.

Edges 18 and 20 of mouth 16 preferably are formed by means including a rod 50 which fits into a sleeve formed in rod pocket panel 52 as will be discussed in connection with FIGS. 3–5. The rod pocket panel shown in FIG. 4 may be made from the same material as panel 10 and has end portions that are folded toward each other along fold lines 54 and 56 to provide increased strength. The sleeve length is now equal to the distance between fold lines 54 and 56, which is approximately the same as the length of rod 50.

The rod pocket panel 52 is then folded about centerline 58 and stitched along line 60 to form a sleeve into which rod may be inserted. The rod pocket panel 52 is thus provided with two end portions 66 and 68 which fit over the main panel end 24 to be on opposite surfaces of main panel 10. Stitch rows 62 and 64 may be used to attach the rod pocket panel 52 to the main panel 10. A second rod packet panel is attached to the other end 26 of the main panel.

At opposite ends of the upper mouth edge 18, the material outboard of the ends of the rod 50 form two flaps which may be folded downwardly toward the lower mouth edge 20. Similar flaps are also formed at opposite ends of the lower mouth edge 20 and folded upwardly to overlap the downwardly extending flaps. The flaps are secured together on one side by a seam which extends from point 40,41 to point 36,38. A similar seam is formed on the other side. These seams which serve as lines of securement, start at about mid-way between the mouth upper edge 18 and lower edge 20 and extend for a distance of at least about 40 mm to point 36, 38 on the periphery of a respective side panel 12 or 14. A typical distance may be about 70 mm. It should be noted that the fabric cut as part of the side panels 12 or 14 does not extend to the mouth 16 or form any part of the mouth/attach area.

Only the upper edge 18 and the lower edge 20 of the mouth 16 are secured to the module as is customary. The side edges of the mouth 16 which extend along the height of the mouth 16 are not directly connected to the module during deployment when gas pressure is maximum. At that time, the large stress build up is distributed along neck portions 28 and 30 (FIG. 3) that are part of the central panel 10. One of the advantages of the present invention resides in providing instead of seams, rounded fabric portions 42 (FIG. 1) from mouth 16 toward the side panel attach area and point 32. Along the sides of the mouth 16, extensions of the material forming the side upper and lower edges along the mouth/attach area are folded toward each other to form the side panels that extend from the mouth at point 40, 41 back to the side panel 12 at point 36, 38. A corresponding structure is present on the other side of the air bag.

Figure 6:
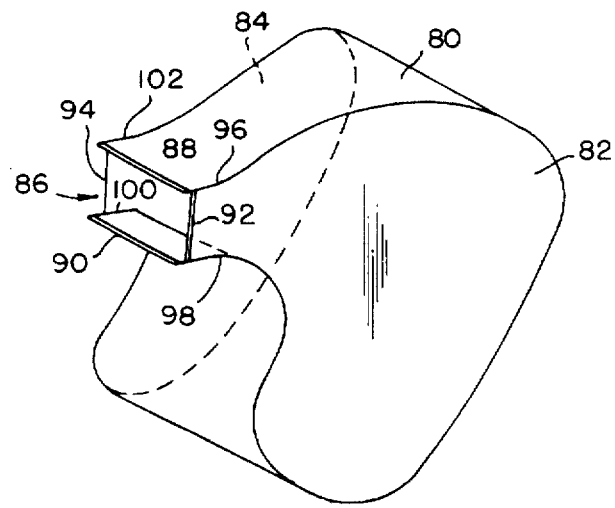
FIG. 6 is a pictorial drawing of a prior art air bag cushion.
Figure 7:
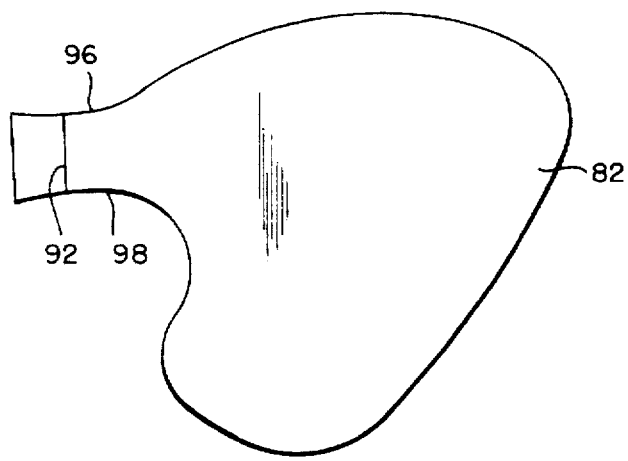
FIG. 7 is a lay-out of the side panels used in the cushion of FIG. 4.
Figure 8:
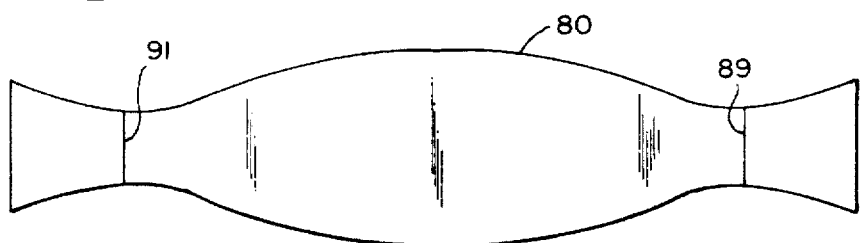
FIG. 8 is a lay-out of the central main panel used in the cushion of FIG. 6.

With reference to FIGS. 6–8, a prior art bag which the present invention is adapted to replace will be briefly described to better clarify some of the advantages of the present invention. The central panel 80 is stitched along opposite sides of its entire length to the two substantially identical side panels 82 and 84. The central main panel 80 has a narrowing taper at both ends toward mouth 86 of the air bag cushion. The upper mouth edge 88 and the lower mouth edge 90 are at opposite ends of the central panel 80 lay-out and adapted to be attached to the module from which inflation gases are received by means of rods, threaded studs or other suitable means. The widths of the central panel 80 at edges 88 and 90 (fold lines 89 and 91) are the narrowest part of the central panel as illustrated in FIG. 8. The reason for the fabric outboard of fold lines 89 and 91 is to provide reinforcement for the fabric and reduce manufacturing tolerances.

At the mouth, side edge 92 is part of the side panel 82 and side edge 94 is part of side panel 84 which is a structure that is not found in the present invention. The lay-out of the side panels in FIG. 7 shows side edge 92 is really a fold line so that the extra material at the snout can be folded back.

The stitching between the central panel 80 side edges and the peripheries of the side panels 82 and 84 extends all the way to the mouth 86 as is apparent from FIG. 6. Side edges 92 and 94 are not attached to the module except through the four seams 96, 98, 100 and 102 that begin in the mouth 86 at the four corners. During inflation, locations where high stresses are found to cause bag failure are the seams at 96 or 98 or 100 or 102 which are between the central panel 80 and the side panels 82 and 84 beginning at mouth 86. By avoiding use of these seams, stress concentrations are reduced.

As pointed out above, since the side panels in the present invention do not extend to the mouth 16 of the air bag, there is no seam starting at the mouth between central panel 10 and side panels 12 and 14 that corresponds to seams 96, 98, 100 or 102 in FIG. 6. The side panel mouth of the prior art has been moved to be part of the main panel 10 to make the mouth/attach area one piece.

Referring to FIGS. 1 and 3, the portion of the main panel lay-out outboard of point 32 toward 36 and 40 on one end and the corresponding portion outboard of point 34 toward 38 and 41 on the other end are cut from the fabric serving as part of central main panel.

A high efficiency of fabric usage is possible when fabricating the present invention because the side panels 12 and 14 of FIG. 2 have a more rounded shape than the side panels of the traditional side panels 52 and 54 of FIG. 7. Also the width of the central panel 10 at its widest portion is greater than its width at the ends. The rod pockets panels shown in FIGS. 3–5 can be formed from fabric that may otherwise be discarded. Another of the advantages of the present invention is that it may be substituted for the prior type of bag construction without requiring changes to the module or to the procedure by which the air bag is folded, pleated and rolled to be fitted within its accompanying module. The deployment characteristics remain unmodified.

Although the invention has been disclosed and illustrated with reference to particular embodiments, the principles are susceptible for use in numerous other embodiments which will be apparent to persons skilled in the art. The invention is to be limited only as indicated by the scope of the appended claims.

What is claimed is:

1. A passenger inside air bag cushion for use in a vehicle to provide occupant protection during a crash that has reduced stress concentrations during deployment, said bag when uninflated and unfolded having:

an elongated central main panel having substantially identical end portions;

a pair of side panels having a curved outer periphery that is attached to opposite side edges of the central main panel to form an enclosure for a confined volume wherein the central main panel totally surrounds the peripheral edges of the side panels in their entirety; and said end portions extending from each end of the central main panel having a respective free end that is distant from a nearest side panel peripheral edge, said free ends being located at upper and lower edges of a mouth of the air bag cushion, said free ends having flaps on each side which extend laterally beyond the width of the mouth, said flaps being folded toward each other to form opposite side walls for said mouth, said folded flaps being joined together by a seam along each sidewall that extends from between said upper and lower edges of said mouth back to the periphery of the side panel, said mouth thus being formed solely from the central main panel with no portion of the side panels forming part of the mouth, and said upper and lower edges of the mouth being adapted for connection to a module through which inflation gas is received when the air bag cushion is deployed.

2. The air bag cushion as defined in claim 1 wherein the upper and lower edges of the mouth are at least 40 mm from the nearest side panel peripheral edge.

3. The air bag cushion as defined in claim 1 wherein the central main panel has a wide central portion between two narrower necked portions which adjoin said free end portions, said free end portions being sufficiently wide to form the flaps which extend laterally beyond the width of the mouth but not beyond the width of the central portion of the main panel when cut from a sheet fabric, said flaps being folded downwardly from opposite sides of the upper mouth edge and upwardly from opposite sides of the lower mouth edge to overlap, and having the seam starting from approximately mid-way between the upper and lower mouth edges and running to the periphery of the side panel for joining said overlapping flaps together.

4. The air bag cushion as defined in claim 1 further having a pair of rods at the upper and lower mouth edges that are shorter than the width of the main panel end portions;

each of said rods being mounted in a separate rod pocket panel;

each of said rod pocket panels having a fold line thereby forming two panel portions, a first seam spaced from said fold line to provide a pocket for receiving one of said rods; and means for securing the panel portions on opposite surfaces of each main panel end portion.

5. The air bag cushion as defined in claim 4 wherein said first seam is a row of stitches that does not attach to main panel fabric.

6. The air bag cushion as defined in claim 5 wherein the free end portions of the main panel have the flaps which extend beyond the ends of the rods forming the mouth edges, said flaps being folded downwardly from the upper mouth edge and upwardly from the lower mouth edge to overlap and being joined by the seam which comprises a stitch line that starts approximately mid-way between the upper and lower mouth edges and extends to the periphery of the side panel.

7. The air bag cushion as defined in claim 1 further having a rod pocket panel secured to each of the free ends of the main panel with rods forming the upper and lower edges of said mouth, and wherein the main panel free ends have a width greater than the length of the rods thereby to provide the flaps at side edges of the mouth, said flaps being folded toward each other and attached together to form side walls for a mouth/attach region, said side walls being substantially perpendicular to the rods when the cushion is inflated.

8. The air bag cushion as defined in claim 7 wherein the flaps which form said side walls on each side of the mouth are attached together by a stitched seam, said flap attaching seam having a length of at least 40 mm as measured from the mouth to the nearest part of the side panel peripheral edge on each side of the central main panel.

9. A passenger side air bag cushion for use in a vehicle for providing occupant protection during a crash comprising:

an elongated central main panel having opposite ends shaped to form a mouth for the cushion that is adapted for attachment to a module through which inflation gas is received, said mouth having a width that is smaller than the width of the opposite ends of the main panel and a height that is smaller than said mouth width;

a pair of side panels having a generally round periphery that is shorter than the length of the main panel;

said main panel having opposite side edges attached to totally surround the periphery of each of the side panels to position free ends of said opposite ends in juxtaposition at top and bottom edges of said mouth and distant from a nearest side panel peripheral edge, said free ends having flaps that extend laterally beyond the edges of the mouth, said flaps being folded toward each other to overlap to form side walls for said mouth, said overlapping flaps being joined together along seams that extend from a position between said upper and lower edges of the mouth to the periphery of the side panel, said mouth thus being formed solely from the central main panel with no portion of the side panels extending to the mouth, and said upper and lower edges of the mouth being adapted for connection to said module.

10. The air bag cushion as defined in claim 9 further having a tapered transition section forming a throat that extends from the mouth to a wider intermediate portion of the main panel where said side panels are attached to the main panel, the material forming the throat being solely from fabric that is part of fabric forming the main panel.

11. The air bag cushion as defined in claim 9 wherein the mouth has a rectangular cross section with a width that is greater than its height and the seams that extend from opposite sides of the bag mouth to a respective side panel extend along a line, one end of said line being at a position which is approximately mid-way between the upper and lower edges of said bag mouth and extending for a distance of at least 40 mm.

12. A passenger side air bag cushion for providing occupant protection during a crash and having a mouth adapted for attachment to a module in a vehicle which supplies inflation gas during deployment and provides occupant protection during a crash, said air bag cushion comprising:

two side panels having generally rounded peripheries and free of any snout portion which extends to said module, and a main panel having a length longer than the periphery of the side panel and having opposite side edges secured to and totally surrounding the peripheries of the side panels, there being end portions at opposite ends of the main panel that are shaped to form a snout formed solely of the main panel fabric which extends from the side panel periphery to the air bag cushion mouth, said mouth having upper and lower edges located at ends of said main panel end portions, the upper and lower mouth edges including rods fitted in a respective rod pocket that is part of a panel that is attached to the main panel end portions, said rods having a length that is shorter than the width of the end portions of said main panel to provide flaps on the end portions at each side of the mouth, and the mouth having a height that is smaller than the rod length, said flaps extending downwardly from an upper end portion of the main panel and upwardly from a lower end portion of the main panel to overlap each other forming the snout, and seams for joining each of said overlapping flaps together, each seam starting about mid-way between the upper and lower mouth edges and extending to the periphery of the side panel, each seam further having a length of at least 40 mm from the mouth to that point on the side panel periphery that is nearest the mouth.

13. A passenger side air bag cushion for use in a vehicle to provide occupant protection during a crash comprising:

an elongated main panel having a wide central portion between two narrow necked down portions adjoining a widened end portion at opposite ends, said opposite ends being adapted for connection to a module from which inflation gas is received;

a pair of side panels having a periphery attached to and surrounded by opposite side edges of said main panel thereby to position said main panel opposite end portions in juxtaposition at upper and lower edges of a bag mouth; and a pair of further panels each secured to a respective end portion of the main panel, each of said further panels being narrower than the widened end portions of the main panel and folded about a first fold line that serves as one of said mouth edges, each of said further panels having panel portions that are attached to opposite faces of a main panel end portion, and a first seam spaced from the associated main panel end and parallel to and spaced from the fold line to define a pocket having a size adapted to receive a rod when positioned at one of said mouth edges.

14. The cushion as defined in claim 13 including a rod in each rod pocket that is shorter than the width of the widened end portion thereby providing outer flaps as part of the main panel that extend beyond the ends of the rods, said flaps extending downwardly from the upper mouth edge and upwardly from the lower mouth edge to overlap each other, and a seam for joining said overlapping flaps that starts approximately mid-way between the upper and lower mouth edges and extends to the periphery of a side panel.

15. The cushion as defined in claim 14 wherein no part of the side panels extends to the bag mouth and the overlapping flap seam has a length of not less than about 40 mm.

* * * * *